UNITED STATES PATENT OFFICE.

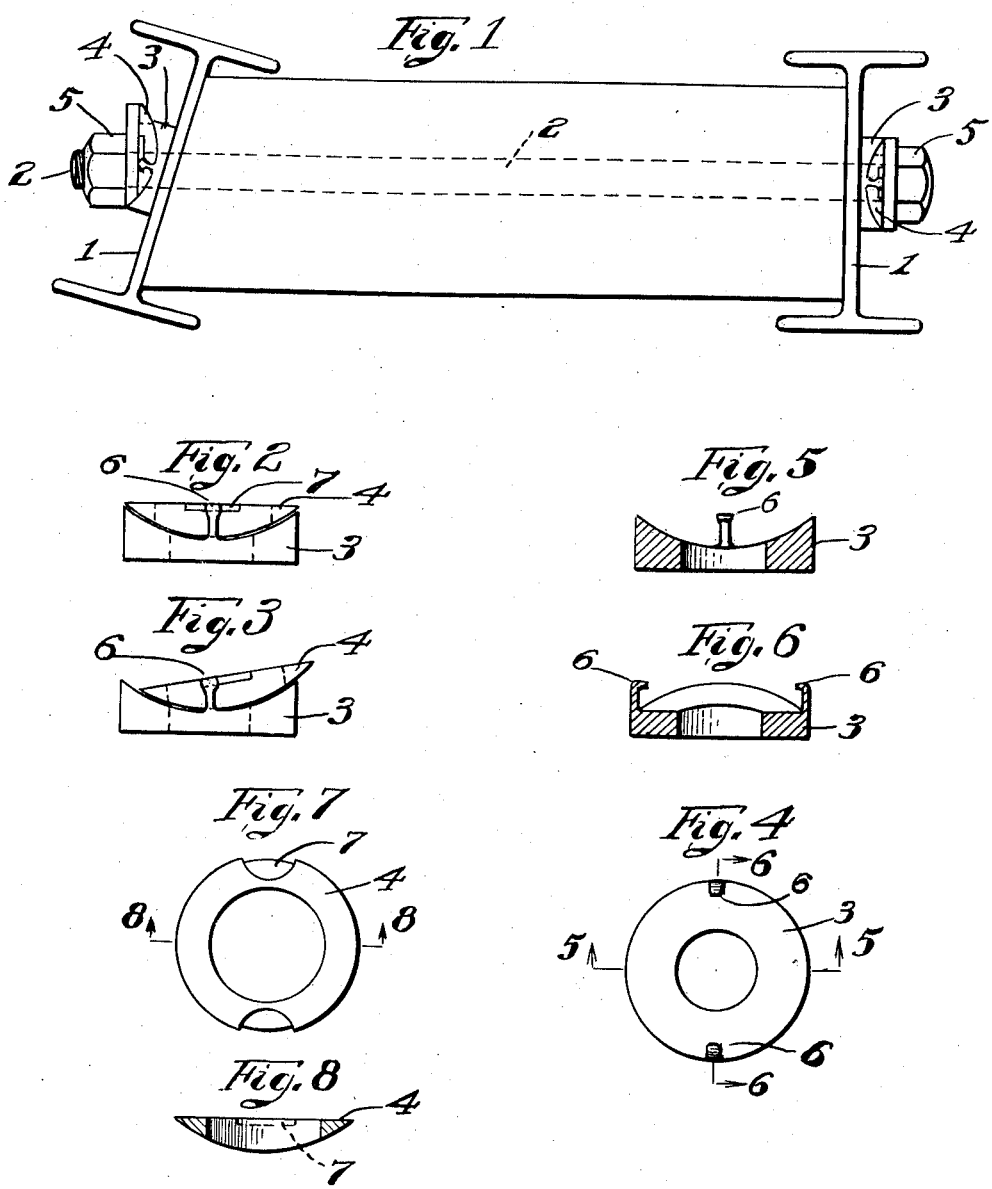

SILAS STILLMAN FULLER, OF LEWISTON, MAINE.

CLAMPING DEVICE.

1,345,358.

Specification of Letters Patent.   Patented July 6, 1920.

Application filed June 2, 1919.   Serial No. 301,283.

*To all whom it may concern:*

Be it known that I, SILAS S. FULLER, a citizen of the United States, residing at Lewiston, county of Androscoggin, State of Maine, have invented certain new and useful Improvements in Clamping Devices, of which the following is a specification.

This invention relates to clamping devices of general application, and is particularly intended for use in the clamping or bolting together of machine or construction parts which lie at acute or obtuse angles to each other and on that account cannot ordinarily be rigidly and permanently connected with the devices commonly used without straining or bending the bolt or other tie connecting the parts.

As illustrative of my invention I shall show and describe it in its application to the clamping of such an object as the familiar load carrying beams used in structural iron and similar work, although it will be understood that this application is purely for purposes of illustration, and that I reserve the right to employ my device in any capacity where it will satisfactorily perform its intended functions. In the illustration selected, load carrying beams are frequently set at an angle to each other, and any of the ordinary devices for rigidly clamping the beams together tends to bend or strain the bolt. My invention has for its object to provide a simple, inexpensive and effective construction by means of which relatively angularly disposed parts to be connected may be rigidly clamped without danger of bending or straining the bolt, tie rod, or other element connecting the said parts.

This object, together with certain features of advantage which will appear more particularly hereinafter, is secured in the device of the present invention, the construction and use of which, together with a selected embodiment which well illustrates the principles involved and which in itself is a form that I have found highly satisfactory in use and well adapted for the factory in use and manufacture, is disclosed in the following specification and drawings, throughout which like reference characters are correspondingly applied. In the drawings:—

Figure 1 is an elevation illustrating the application of my invention to structural work.

Figs. 2 and 3 are details illustrating the assembly and operation of the clamp.

Fig. 4 is a plan view of the concave clamping surface.

Figs. 5 and 6 are sections on the lines 5—5 and 6—6, respectively of Fig. 4.

Fig. 7 is a plan view of the convex clamping surface, and

Fig. 8 is a section on the line 8—8, of Fig. 7.

For the purposes of this application, I have illustrated my clamping device as applied to a familiar form of structural work in which a pair of I beams 1 are disposed in non-parallel relation to each other and are connected by any suitable tie, as the bolt 2.

My clamp comprises duplicate surfaces of concavity and convexity 3 and 4, respectively, applied to the ends of the bolt 2 between the beams 1 and the bolt heads or nuts 5, and slidable one upon the other to find their proper clamping seats.

Each member 3 is relatively stationary on the bolt, and each member 4 is loose on the bolt whereby it is free to automatically adjust itself on its complementary member 3, the convex portion of the member 4 seating in the concavity of the member 3. The faces of the members 3 and 4 against which the I beams 2 and nuts 5 bear are flat. In order to prevent separation of the members 3 and 4 of a clamping pair, they may be interlockingly connected in any suitable manner, as by bending over oppositely disposed ears 6 formed upon the member 3 into grooves 7 formed in the member 4. The length of the grooves 7 and the diameter of the bolt hole in the member 4 are sufficient to permit the automatic self adjusting movements of the member 4 as it seeks and finds its seat upon member 3.

My improved clamp has a clamping range within which parts set at acute or obtuse angles to each other may be rigidly clamped without liability of bending or straining the bolt or other tie connecting the said parts. The members 3 are here shown as abutting the I beams and the members 4 as abutting the nuts 5 but the arrangement may be reversed.

Various modifications in the form and construction of my device may obviously be resorted to if within the limits of the appended claims.

What I therefore claim and desire to secure by Letters Patent is:

1. A clamp for rigidly connecting spaced structural elements, comprising a tie extending between said elements, a relatively stationary abutment member applied to said tie in abutting relation to the outer face of one of said spaced elements and having an outwardly disposed surface of concavity, and a clamping member applied to said tie beyond said abutment member and having a surface of convexity opposing said surface of concavity and automatically self-adjustable thereon to provide a clamping range effective to permit the spaced elements to be rigidly connected without bending or straining the tie.

2. A clamp for rigidly connecting spaced structural elements, comprising a tie extending between said elements, a relatively stationary abutment member applied to said tie in abutting relation to one of said spaced elements and having a surface of concavity, a clamping member applied to said tie beyond said abutment member and having a surface of convexity opposing said surface of concavity and automatically self-adjustable thereon to provide a clamping range effective to permit the spaced elements to be rigidly connected without bending or straining the tie, and an interlocking connection between said members for preventing separation thereof but permitting limited adjusting movement of the clamping member upon the abutment member.

3. A clamp for rigidly connecting spaced structural elements, comprising a tie extending between said elements, a relatively stationary abutment member applied to said tie in abutting relation to one of said spaced elements and having a surface of concavity, a clamping member applied to said tie beyond said abutment member and having a surface of convexity opposing said surface of concavity and automatically self-adjustable thereon to provide a clamping range effective to permit the spaced elements to be rigidly connected without bending or straining the tie, and an interlocking tongue and groove connection between members for preventing separation thereof but permitting limited adjusting movement of the clamping member upon the abutment member.

4. A clamp for rigidly connecting a pair of spaced non-parallel elements comprising a tie extending between said elements, an abutment member applied to said tie in abutting relation to one of said elements and having a surface of concavity and a clamping member applied to said tie and having a surface of convexity opposing said surface of concavity and automatically self-adjustable thereon to provide a clamping range effective to permit the spaced elements to be rigidly connected without bending or straining the tie.

5. A clamp for rigidly connecting a pair of spaced I-beams, comprising a bolt extending between said beams, a relatively stationary washer applied to said bolt and having a flat face abutting one of said beams and a concaved face, and a clamping washer loosely mounted on said bolt and having a surface of convexity opposing said surface of concavity and automatically self-adjustable thereon to provide a clamping range effective to permit the beams to be rigidly connected without bending or straining the bolt.

6. A clamp for rigidly connecting a pair of spaced non-parallel I-beams, comprising a bolt extending between said beams, an abutment member applied to said tie in abutting relation to one of said beams and having a surface of concavity, and a clamping member having a bolt hole of greater diameter than the bolt and applied to said bolt beyond said abutment member and having a surface of convexity opposing said surface of concavity and automatically self-adjustable thereon to provide a clamping range effective to permit the beam to be rigidly connected without bending or straining the bolt.

In testimony whereof I affix my signature in presence of two witnesses.

SILAS STILLMAN FULLER.

Witnesses:
 MARION F. WEISS,
 GEO. B. RAWLINGS.